UNITED STATES PATENT OFFICE 2,664,378

MANUFACTURE OF ARTICLES FROM POLYETHYLENE FILMS

George W. Heller, Wilmington, Del., assignor to E. I. du Pont de Nemours and Company, Wilmington, Del., a corporation of Delaware No Drawing. Application May 29, 1950, Serial No. 165,119

4 Claims. (Cl. 154—139)

This invention relates to improvements in processes for manufacturing bags and similar articles from polyethylene film.

Polyethylene adhesives which require vulcanization have been known heretofore. It has also been known that polyethylene films can be joined together by other methods such as by crimping or fusion. In the manufacture of bags and other such articles requiring rapid sealing it is desirable to employ an adhesive which does not require vulcanization and which can be applied to the film very readily by means of bag-making machinery commonly employed in the art. Prior to the present invention it was not known that these results could be achieved, since very few adhesives were capable of producing a polyethylene-to-polyethylene bond, and since the adhesives which had been found to be effective were very difficult to apply by using the conventional bag-making machinery. This was true because in conventional bag-making machines the adhesive is applied to the film or paper by means of an applicator which spreads the adhesive, after which the applicator is returned mechanically to the vessel containing the adhesive, whereby the supply thereof held by the applicator is replenished for use in the next stroke; in applying adhesives in this manner to polyethylene film, all of the previously known quick-drying adhesives for polyethylene produced "stringiness" at the time when the applicator was withdrawn from the film after each stroke. This "stringiness" interfered with the operation of the applicator and thus made rapid manufacture of polyethylene bags in conventional machinery difficult or impossible. These difficulties have invariably been observed in attempting to use lacquer type adhesives in the manufacture of bags from polyethylene film.

An object of this invention is to overcome the above-described difficulties in the manufacture of adhesively bonded articles made of polyethylene film, e. g. polyethylene bags, overwraps, etc. Other objects of the invention appear hereinafter.

These objects are accomplished by means of the present invention wherein an adhesive is employed in the manner described below, said adhesive comprising (1) a volatile normally liquid organic solvent of the class consisting of dialkyl ethers, alkyl esters of alkanoic acids, and dialkyl ketones, having a boiling point below 150° C., preferably below 120° C., (2) a dispersed polymer, hereinafter described, (3) a dissolved polymer also hereinafter described, and (4) a tackifier of the class consisting of wood rosin, diethylene glycol esters of polymerized wood rosin, polycyclic aromatic hydrocarbons having molecular weights within the range of 500 to 2000, maleic anhydride-modified ester gums, coumarone-indene resins, hydrogenated wood rosin, glycerol esters of polymerized wood rosin and the like. These tackifiers are all well known, commercially available products, employed in the adhesive art for increasing the tackiness of certain previously known adhesive compositions; they are sold under such names as "Wood Rosin WG," "Polypale" Ester No. 2, "Kenflex" A, "Cumar" V 1/2, "Staybelite," "Piccolyte," "Polypale" Ester No. 10, and "Vistac"-1 (a low molecular weight hydrocarbon polymer produced by Advance Solvents and Chemical Corp. (New York city) Saybolt viscosity (Univ.) (210° F.) 2800+sec., density 7.5 lbs./gal.). These compositions are defined hereinafter in Table 1. In addition to the foregoing ingredients other modifiers may also be included if desired; these include high boiling esters of aliphatic or aromatic acids with $C_4$ to $C_9$ alcohols, e. g. dinonyl diglycolate, dioctyl phthalate, dinonyl adipate, pentamethylene glycol glutarate, triethylene/glycol stearate, diethylene glycol oleate, etc., and other plasticizers or plasticizer aids, such as hydroabietyl alcohol. It is also desirable to add one or more stabilizers such as organophosphates, dibasic lead phosphite, phenyl glycidyl ether, dibutyl tin maleate, diglycidyl ether of bis phenol, lead salts of organic or inorganic acids, barium and cadmium salts of naphthenic or ricinoleic acids, and one or more antioxidants such as hydroquinone, lecithin, propyl gallate, thiodipropionates including lauryl thiodipropionate, nordihydroguaiaretic acid, butylated hydroxy anisole, diphenyl amine, alpha phenyl naphthylamine, beta phenyl naphthylamine, etc.

The aforesaid adhesive composition, in the practice of this invention, can be spread upon polyethylene film by means of an applicator, following which the applicator can be withdrawn from the adhesive coating without the development of the excessive "stringiness" encountered in using lacquer type adhesives. This "stringiness" of solution type adhesives can, in general, be demonstrated in a rather simple manner by placing a specimen of such adhesive between the thumb and the forefinger, and moving the thumb and forefinger apart, whereby the adhesive is drawn into numerous threads or "strings"; in contrast with this the adhesives of this invention produce a rather firm bond on drying and do not show stringiness while drying. In the manufacture of polyethylene bags in accordance with this invention the avoidance of this "stringiness" greatly speeds up the output of the bag-making machines, as explained above.

After the adhesive has been applied, the films to be bonded are pressed together, and the solvent is removed from the intervening layer of adhesive by diffusion through the film. This can be accomplished by storing the bags or other adhesively bonded articles at room temperature for about three to fourteen days, or by heating at 50° C. for a few hours. The resulting polyethylene-to-polyethylene bond is very strong, and has aging properties (especially when an anti-oxidant and/or stabilizer is present) which are superior to those of the previously known non-thermosetting adhesives for polyethylene.

The dispersed polymer (or polymers) mentioned hereinabove may be a natural or synthetic rubber, which is not necessarily vulcanizable. It is desirable that the dispersed polymer be virtually insoluble in the organic solvent at ordinary temperature; in any event the polymer should not dissolve so readily as to prevent dispersion thereof in the form of discrete solid particles. A suitable dispersed polymer is chlorinated polyethylene having a sufficiently low chlorine content and/or a sufficiently high molecular weight to be nearly insoluble in the medium (e. g. less than about 25%, when the parent polyethylene has a molecular weight of about 16,000 to 20,000). Other polymers which may be employed in the dispersed form are ethylene-vinyl ester interpolymers having a sufficiently high content of the ethylene component and/or a sufficiently high molecular weight to be virtually insoluble. Reclaim rubber is quite insoluble and may be employed as the dispersed polymer. Buna S (defined hereinafter in Table 1), polyethylene, and "Vistanox" polybutene may also be used in this way.

The dissolved polymer (or polymers) which may be employed include the chloropolyethylenes having a sufficiently high chlorine content and/or a sufficiently low molecular weight to be readily soluble in the medium, and the ethylenevinyl ester interpolymers which have either a sufficiently low ethylene content or a sufficiently low molecular weight to be readily soluble. Crepe rubber, neoprene rubber, Buna N (defined hereinafter in Table 1), and readily soluble polybutenes may also be employed as the dissolved polymer.

Both the dispersed and the dissolved polymers should be synthetic or natural rubbers. Certain of these synthetic or natural rubbers may be employed either as dispersed polymers or as dissolved polymers, depending upon the solvent, method of preparation, etc. The usual method of preparation is to mill the two polymers together and thereafter to heat the mixture with the organic solvent, whereby a solution-dispersion (hereinafter called a dispersol) is obtained on cooling with vigorous agitation, the less soluble polymer being present in the resulting mixture as the dispersed phase. The solubility of the less soluble polymer may be decreased by the presence of the more soluble polymer. For best results the dispersed polymer should be readily compatible with the dissolved polymer.

The organic solvents which are employed in the practice of this invention must be sufficiently volatile to permit easy removal by diffusion through the film, accompanied by evaporation. In general the solvents should have boiling points below 120° C., although solvents with boiling points up to 150° C. can be used. Good results are obtained with the low-boiling esters of alkanols with alkanoic acids, e. g. methyl formate, ethyl acetate, methyl propionate, propyl acetate, etc. Dialkyl ketones such as acetone, diethyl ketone, ethyl methyl ketone, etc. are also effective. Dialkyl ethers may be used, but these are somewhat less desirable because they cause a slight swelling of the polyethylene film during bonding, which results in "curling" of the seam. Other solvents, such as certain hydrocarbons which cause excessive "curling" or swelling of polyethylene film, are generally not employed.

The invention is illustrated further by means of the following example:

*Example.*—A series of tests was made wherein polyethylene films were bonded together with an intervening layer of adhesive obtained as set forth in the following table. In each instance the coating of adhesive was spread on polyethylene film, and the appearance or non-appearance of any "stringiness" upon withdrawal of the applicator was observed. The bonding was accomplished by pressing the adhesive-coated surfaces together, usually under the very light pressure of about 1/8 to 1/4 pound per square inch, followed by storage of the bonded article for three to fourteen days to remove solvent by diffusion through the polyethylene film. The results were as set forth in the table.

*Table.—Dispersol adhesives for polyethylene films*

| Test No. | Film formers | | Tackifiers | Plasticizers | Solvents | Peel bond strength | Stringiness |
|---|---|---|---|---|---|---|---|
| | Dissolved | Dispersed | | | | | |
| 1 | 7.5 grams chlorinated polyethylene (M. W.=16,000 to 18,000, i. e. grade [1] 8-16, before chlorination), 30% Cl. | 12.5 grams chlorinated polyethylene (M. W.=18,000 to 20,000, i. e., grade 2-3, before chlorination), 20% Cl. | 40 grams dihydroabietyl phthalate. | 5 grams di(3,5,5-trimethylhexyl) diglycolate, 20 grams hydroabietyl alcohol. | 80 grams n-propyl acetate. | Excellent | Very slight. |
| 2 | 7.5 grams ethylene-vinyl acetate interpolymer (E/VA= 3/1, M. W.=l e s s than 10,000). | 12.5 grams ethylene-vinyl acetate interpolymer (E/VA=8/1, high M. W.). | 20 grams diethylene glycol ester of polymerized wood rosin ("Polypale" Ester No. 2). | None | 60 grams n-propyl acetate. | Good | None. |
| 3 | 7.5 grams chlorinated polyethylene (M. W. =16,000 to 17,000 before chlorination), 30% Cl. | 12.5 grams chlorinated polyethylene (M. W.=18,000 to 20,000 before chlorination), 20% Cl. | 40 grams diethylene glycol ester of polymerized wood rosin. | 5 grams di(3,5,5-trimethylhexyl) diglycolate, 10 grams hydroabietyl alcohol. | 75 grams n-propyl acetate. | Excellent | Do. |

[1] Grade is number of grams extruded under a load of 2,160 grams at 190° C. in 10 minutes through an orifice 8 mm. long having a diameter of 0.0374 in.

Table.—Dispersol adhesives for polyethylene films—Continued.

| Test No. | Film formers - Dissolved | Film formers - Dispersed | Tackifiers | Plasticizers | Solvents | Peel bond strength | Stringiness |
|---|---|---|---|---|---|---|---|
| 4 | 6 grams butadiene-styrene interpolymers (Buna S). | 8 grams reclaim rubber. | 14 grams wood rosin ("Wood Rosin WG"). | None | 47 grams n-propyl acetate. | Good | Moderate. |
| 5 | 3 grams butadiene-acrylonitrile (15% acrylonitrile component (Buna N)). | 12 grams crepe rubber. | 30 grams low molecular weight hydrocarbon polymer ("Kenflex" A polycyclic resinous hydrocarbon derived from dimethyl naphthalenes), 7.5 grams maleic anhydride-modified ester gum. | do | 110 grams ethyl acetate. | Fair | Do. |
| 6 | 5 grams butadiene-acrylonitrile. | 15 grams reclaim rubber. | 20 grams coumarone-indene ("Cumar" V1/2), 20 grams poly-iso-butylene. | do | 60 grams methyl ethyl ketone. | Poor | Very slight. |
| 7 | do | do | 20 grams hydrogenated wood rosin ("Staybelite"). | do | do | Good | Do. |
| 8 | 5 grams polychloroprene (Neoprene Type AC). | 5 grams chlorinated polyethylene (M.W. = 18,000 to 20,000 before chlorination), 20% Cl. | 10 grams synthetic resinous polycyclic hydrocarbon from dimethyl naphthalene polymer ("Kenflex" A). | do | 25 grams methyl ethyl ketone, 5 grams n-propyl acetate. | do | None. |
| 9 | 12.5 grams crepe rubber. | 12.5 grams reclaim rubber. | 20 grams wood rosin, 7.5 grams "Kenflex" A. | do | 100 grams ethyl acetate. | Fair | Moderate. |
| 10 | 25 grams polybutene. | 12.5 grams polyethylene (M.W. = 18,000 to 20,000). | 25 grams pinene polymer ("Piccolyte"). | do | 50 grams n-butyl ether, 25 grams isopropyl ether. | do | None (film curls). |
| 11 | 5 grams polychloroprene (Neoprene Type AC). | 20 grams butadiene-styrene interpolymer (Buna S). | 15 grams hydrogenated rosin. | do | 100 grams methyl ethyl ketone. | Good | Moderate. |
| 12 | 5 grams crepe rubber. | 10 grams "Vistanex" polybutene. | 15 grams glycerol ester of polymerized wood rosin ("Polypale" Ester No 10), 15 grams "Vistac"-1 (low M.W. hydrocarbon polymer as hereinabove described). | do | 65 grams n-propyl acetate, 15 grams isopropyl ether. | do | Do. |
| 13 | 7.5 grams chlorinated polyethylene (M.W. = 16,000 to 17,000 before chlorination), 30% Cl. | 12.5 grams chlorinated polyethylene (M.W. = 18,000 to 20,000 before chlorination), 20% Cl. | 40 grams diethylene glycol ester of polymerized wood rosin. | 5 grams di(3,5,5-trimethylhexyl) diglycolate, 10 grams hydroabietyl alcohol plus 0.02 gram hydroquinone and .75 gram "Victor" Stabilizer No. 53 (organophosphate ester, 2-ethylhexyl Na phosphate ester). | 75 grams n-propyl acetate. | Excellent, retains strength up on prolonged storage. | None. |

In contrast with the foregoing examples, simple solutions of chloropolyethylene or other film-forming polymers produce excessive stringiness when employed as adhesives for polyethylene in the manner described above.

It is to be understood that the compositions set forth in the illustrative example may be varied rather widely without departing from the spirit and scope of the present invention. As shown in the example, the quantities of the respective ingredients can be varied over a very wide range. In general, however, it is preferred to use, per 100 parts by weight of the volatile organic solvent, 10 to 25 parts of the dispersed polymer, 3 to 15 parts of the dissolved polymer, and 25 to 50 parts of the tackifier. In addition to this there may be employed 5 to 20 parts of plasticizer. Also it is desirable to add about 0.1 to 4.0 parts of a stabilizer of the kind described above and 0.01 to 1.0 part of an antioxidant. Hydroabietyl alcohol (5 to 15 parts) may also be included if desired.

The present invention is useful in manufacturing polyethylene bags, receptacles, envelopes, wrappings, and other articles of commerce, the manufacture of which requires rapid production of polyethylene-to-polyethylene bonds.

I claim:

1. A process for adhesively bonding polyethylene films together which comprises applying pressure to the film surfaces having an intervening layer of a composition comprising a volatile normally liquid organic solvent of the class consisting of dialkyl ethers, alkyl esters of alkanoic acids and dialkyl ketones, having a boiling point below 150° C., a rubber dispersed in the said solvent in the form of discrete solid particles, a rubber dissolved in the said solvent, and a tackifier of the class consisting of wood rosin, diethylene glycol esters of polymerized wood rosin, polycyclic aromatic hydrocarbons having molecular weights within the range of 500 to 2000, maleic anhydride-modified ester gums, coumarone-indene resins, hydrogenated wood rosin, and glycerol esters of polymerized wood rosin, and thereafter removing the said solvent by diffusion through the said polyethylene films and by evaporation.

2. The process of claim 1 in which both the dispersed rubber and the dissolved rubber are chlorinated polyethylenes.

3. A process for adhesively bonding polyethylene films together which comprises applying pressure to the film surfaces having an intervening layer of a composition comprising as a solvent medium an alkyl ester of an alkanoic acid, said ester having a boiling point below 120° C., a chlorinated polyethylene rubber dispersed in the said solvent, another chlorinated polyethylene rubber dissolved in the said solvent, a diethylene glycol ester of wood rosin as a tackifier, and di(3,5,5-trimethylhexyl) diglycolate as a plasticizer, and thereafter removing the said solvent medium by diffusion through the said polyethylene films and by evaporation.

4. An adhesive composition for bonding polyethylene films together, comprising as a solvent medium an alkyl ester of an alkanoic acid, said ester having a boiling point below 120° C., a chlorinated polyethylene rubber dispersed in the said solvent, another chlorinated polyethylene rubber dissolved in the said solvent, a diethylene glygol ester of wood rosin as a tackifier, and di(3,5,5-trimethylhexyl) diglycolate as a plasticizer.

GEORGE W. HELLER.

References Cited in the file of this patent

UNITED STATES PATENTS

| Number | Name | Date |
|---|---|---|
| 1,458,308 | Plasterer | June 12, 1923 |
| 2,170,947 | Habgood et al. | Aug. 29, 1939 |
| 2,491,477 | Chmiel | Dec. 20, 1949 |
| 2,543,229 | Chapman | Feb. 27, 1951 |

FOREIGN PATENTS

| Number | Country | Date |
|---|---|---|
| 544,359 | Great Britain | Apr. 9, 1942 |